(12) United States Patent
Boissière

(10) Patent No.: US 11,107,282 B1
(45) Date of Patent: Aug. 31, 2021

(54) USING COMFORT MEASUREMENTS TO SUGGEST VIRTUAL REALITY CONTENT

(71) Applicant: Apple Inc., Cupertino, CA (US)

(72) Inventor: Clément Pierre Nicolas Boissière, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/140,847

(22) Filed: Sep. 25, 2018

Related U.S. Application Data

(60) Provisional application No. 62/566,152, filed on Sep. 29, 2017.

(51) Int. Cl.
| | |
|---|---|
| G06F 19/00 | (2018.01) |
| A63F 13/792 | (2014.01) |
| G06F 3/01 | (2006.01) |
| G06Q 30/06 | (2012.01) |
| G06F 21/32 | (2013.01) |
| G06K 9/00 | (2006.01) |
| A63F 13/46 | (2014.01) |
| G06T 19/00 | (2011.01) |

(52) U.S. Cl.
CPC ............ *G06T 19/006* (2013.01); *A63F 13/46* (2014.09); *A63F 13/792* (2014.09); *G06F 3/011* (2013.01); *G06F 21/32* (2013.01); *G06K 9/00302* (2013.01); *G06Q 30/0631* (2013.01); *G06Q 30/0643* (2013.01)

(58) Field of Classification Search
None
See application file for complete search history.

(56) References Cited

U.S. PATENT DOCUMENTS

| | | | |
|---|---|---|---|
| 8,499,257 B2 * | 7/2013 | Mattingly | G06F 3/04842 715/810 |
| 10,078,909 B1 * | 9/2018 | Chen | G06N 20/00 |
| 10,242,502 B2 * | 3/2019 | Dange | G06T 19/006 |
| 2010/0153885 A1 * | 6/2010 | Yates | H04N 21/4532 715/841 |
| 2014/0078039 A1 * | 3/2014 | Woods | H04N 21/442 345/156 |
| 2014/0157169 A1 * | 6/2014 | Kikin-gil | G06F 3/0486 715/770 |
| 2015/0156529 A1 * | 6/2015 | Peterson | H04N 21/42201 725/12 |
| 2015/0178511 A1 * | 6/2015 | Klappert | G06F 21/6245 726/27 |
| 2015/0279117 A1 * | 10/2015 | Schimke | G06F 16/00 345/633 |
| 2016/0170998 A1 * | 6/2016 | Frank | G06F 16/24578 707/748 |
| 2016/0339300 A1 * | 11/2016 | Todasco | G16H 20/30 |
| 2016/0342782 A1 * | 11/2016 | Mullins | G06F 21/32 |

(Continued)

*Primary Examiner* — Motilewa Good Johnson
(74) *Attorney, Agent, or Firm* — Dentons US LLP

(57) ABSTRACT

The present disclosure relates to using user biometric characteristics measured while the user is viewing virtual reality content to provide suggestions for downloadable virtual reality content in a virtual reality content store. An exemplary user device determines a criterion based on the user characteristics to filter the virtual reality content so that only virtual reality content that meets the criterion are displayed to the user. The virtual reality content displayed in the virtual reality content store has a corresponding activity level score.

25 Claims, 12 Drawing Sheets

(56) References Cited

U.S. PATENT DOCUMENTS

| | | | | |
|---|---|---|---|---|
| 2018/0011682 A1* | 1/2018 | Milevski | | G06F 3/165 |
| 2018/0096531 A1* | 4/2018 | Greenhalgh | | G06F 3/012 |
| 2018/0190376 A1* | 7/2018 | Hill | | A61B 5/0482 |
| 2018/0255335 A1* | 9/2018 | George | | H04N 21/44222 |
| 2018/0373717 A1* | 12/2018 | Eriksson | | G06F 17/16 |
| 2019/0200085 A1* | 6/2019 | Merced | | H04N 21/4667 |

* cited by examiner

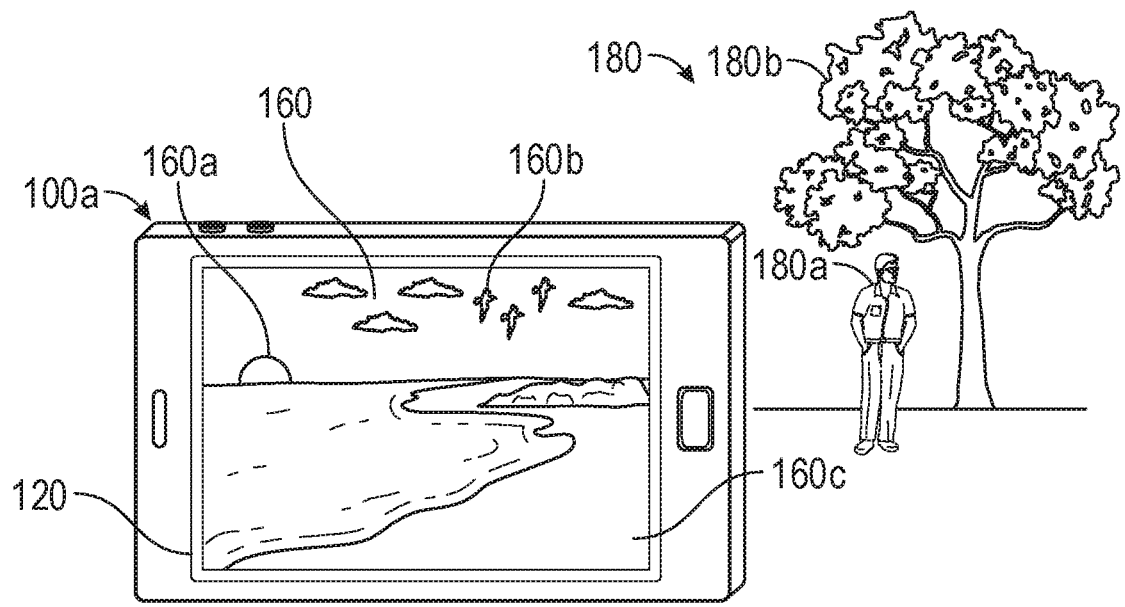
FIG. 1C Virtual Reality
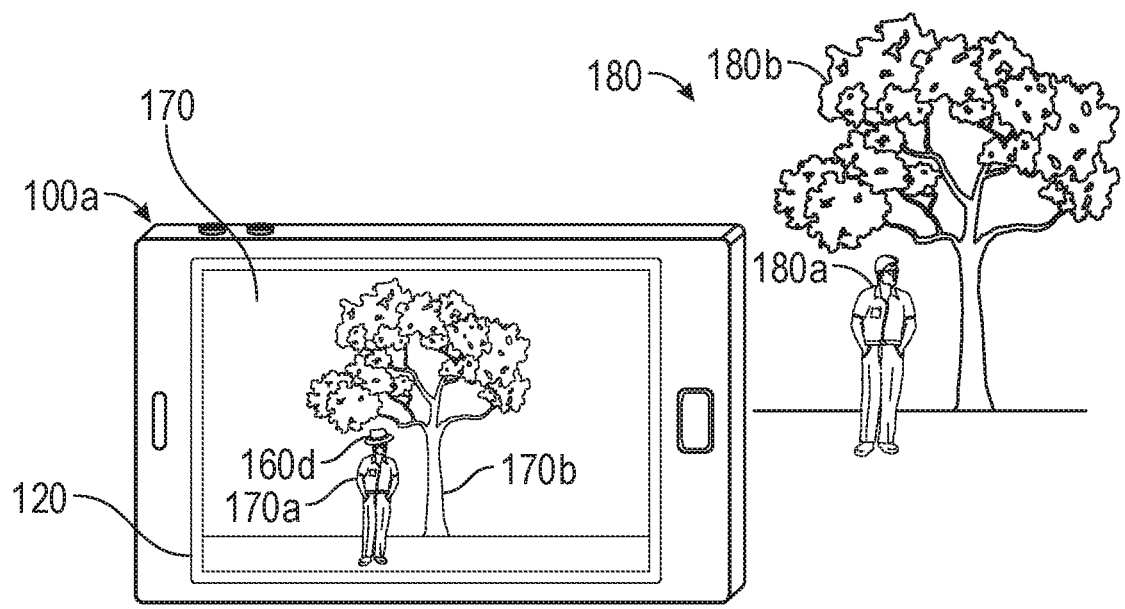
FIG. 1D Augmented Reality (pass-through video)

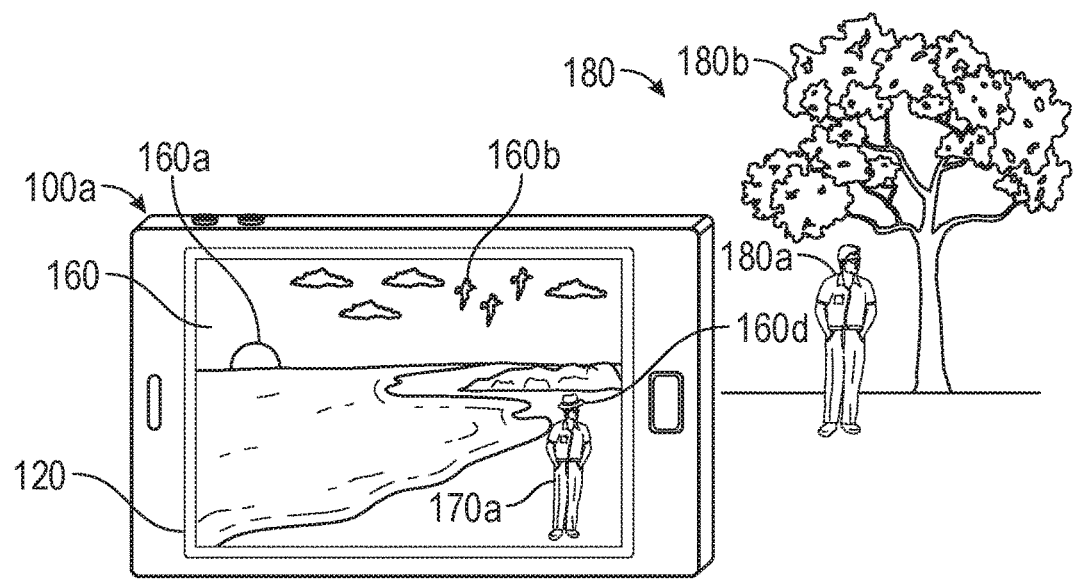
FIG. 1E  Augmented Virtuality
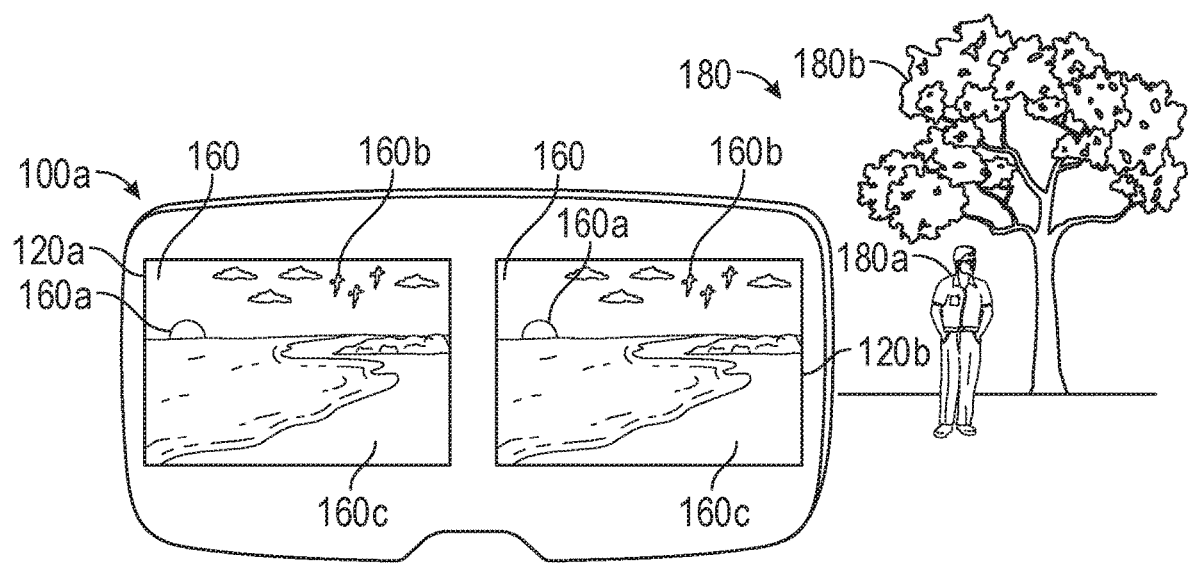
FIG. 1F  Virtual Reality

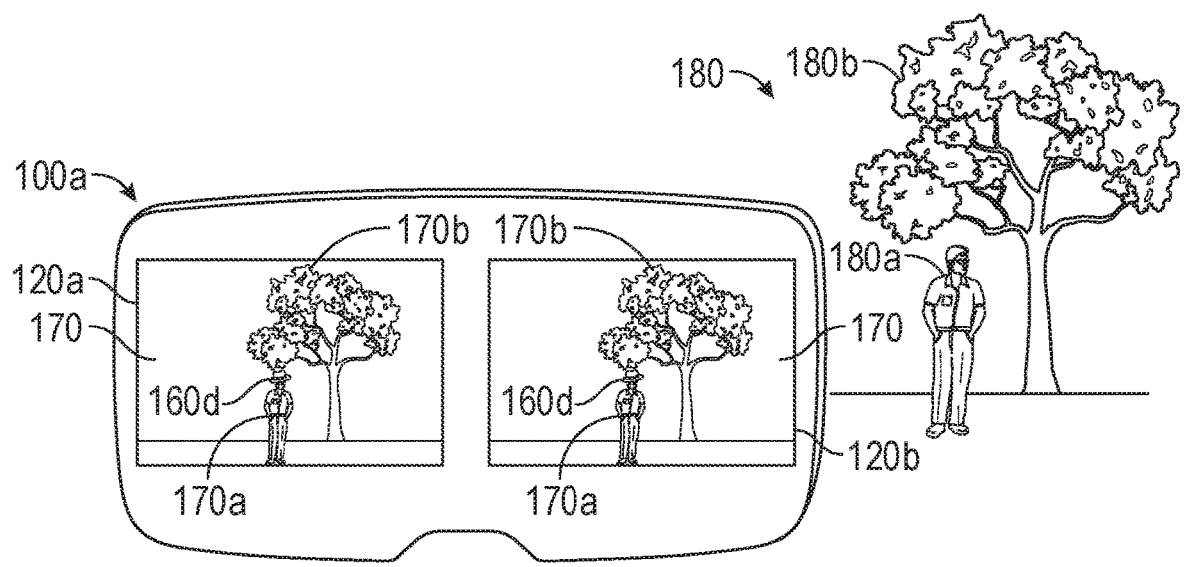
FIG. 1G  Augmented Reality (pass-through video)
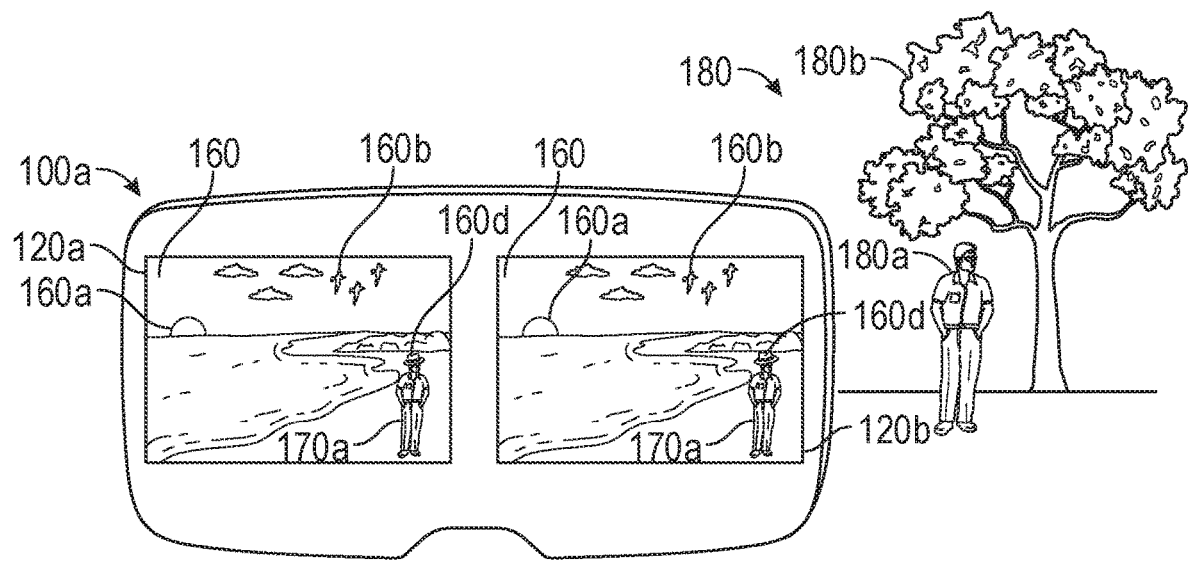
FIG. 1H  Augmented Virtuality

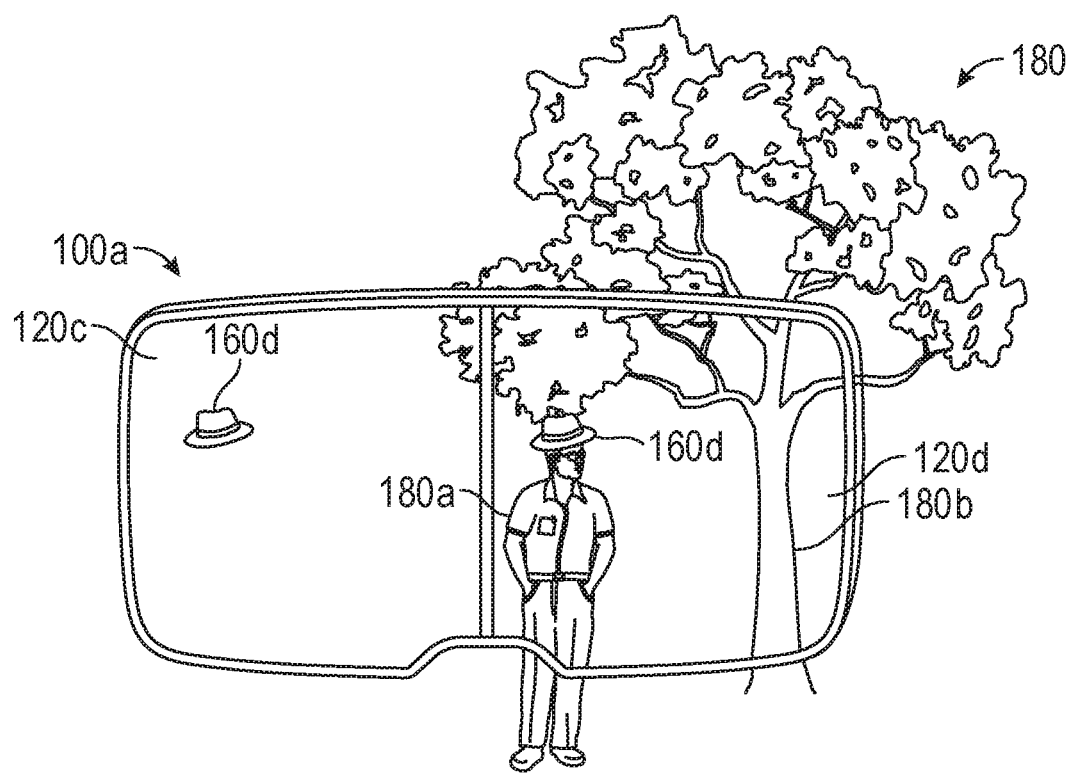
FIG. 1I — Augmented Reality (heads-up display)

USING COMFORT MEASUREMENTS TO SUGGEST VIRTUAL REALITY CONTENT

CROSS-REFERENCE TO RELATED APPLICATIONS

This application claims priority to U.S. Provisional Patent Application Ser. No. 62/566,152, entitled "Using Comfort and Fatigue Measurements to Suggest Virtual Reality Content," filed on Sep. 29, 2017, the content of which is hereby incorporated by reference in its entirety for all purposes.

TECHNICAL FIELD

The present disclosure relates generally to virtual reality experiences, and more specifically to using user biometric characteristics in relation to downloadable virtual reality content.

BACKGROUND

A content store is a platform where content may be purchased for use in an application or an application itself may be purchased. An application store is one type of content store, that provides an organized platform for application developers to sell applications and for consumers to purchase applications. Applications in the content store may be organized so that consumers may easily find the desired applications or content.

SUMMARY

The present disclosure describes techniques for measuring user biometric characteristics while the user is viewing virtual reality content and using the user biometric characteristics to suggest downloadable virtual reality content in a virtual reality content store.

In some embodiments, a method is described. The method comprising: at an electronic device with one or more biometric sensors and a display: receiving a request to display one or more downloadable virtual reality content from a virtual reality content store; determining a criterion based on one or more biometric characteristics, wherein the biometric characteristics are based on a change in one or more physiological states of a user detected while the user is viewing virtual reality content; and in accordance with receiving the request to display the one or more downloadable virtual reality content from the virtual reality content store: displaying, on the display, one or more affordances representing virtual reality content, wherein the one or more affordances representing virtual reality content that meet the criterion are prioritized over the one or more affordances representing virtual reality content that do not meet the criterion.

The method further includes, prior to determining the criterion, measuring the one or more biometric characteristics of the user using one or more biometric sensors. In some examples, the one or more biometric characteristics includes heart rate. In some examples, the one or more biometric characteristics includes physical activity level. In some examples, the one or more biometric characteristics includes eye movements. In some examples, the one or more biometric characteristics includes facial expressions.

In some embodiments, the one or more downloadable virtual reality content have corresponding scores determined based on data collected from a plurality of VR devices and the one or more downloadable virtual reality content are selected for display at least in part based on the corresponding scores of the one or more downloadable virtual reality content meeting the criterion. The method further includes, concurrently displaying, a score of a respective virtual reality content with an affordance of the one or more affordances representing virtual reality content. The criterion is determined based on measurements of the one or more characteristics of the user measured prior to receiving the request. The criterion is determined based on measurements of the one or more characteristics of the user measured after receiving the request.

In some embodiments, a non-transitory computer-readable medium is described. The non-transitory computer-readable storage medium comprising one or more programs configured to be executed by one or more processors of an electronic device with one or more biometric sensors and a display, the one or more programs including instructions for: receiving a request to display one or more downloadable virtual reality content from a virtual reality content store; determining a criterion based on one or more biometric characteristics, wherein the biometric characteristics are based on a change in one or more physiological states of a user detected while the user is viewing virtual reality content; and in accordance with receiving the request to display the one or more downloadable virtual reality content from the virtual reality content store: displaying, on the display, one or more affordances representing virtual reality content, wherein the one or more affordances representing virtual reality content that meet the criterion are prioritized over the one or more affordances representing virtual reality content that do not meet the criterion.

In some embodiments, a transitory computer-readable medium is described. The transitory computer-readable storage medium comprising one or more programs configured to be executed by one or more processors of an electronic device with one or more biometric sensors and a display, the one or more programs including instructions for: receiving a request to display one or more downloadable virtual reality content from a virtual reality content store; determining a criterion based on one or more biometric characteristics, wherein the biometric characteristics are based on a change in one or more physiological states of a user detected while the user is viewing virtual reality content; and in accordance with receiving the request to display the one or more downloadable virtual reality content from the virtual reality content store: displaying, on the display, one or more affordances representing virtual reality content, wherein the one or more affordances representing virtual reality content that meet the criterion are prioritized over the one or more affordances representing virtual reality content that do not meet the criterion.

In some embodiments, an electronic device is described. The electronic device comprising: one or more biometric sensors; a display; one or more processors; and memory storing one or more programs configured to be executed by the one or more processors, the one or more programs including instructions for: receiving a request to display one or more downloadable virtual reality content from a virtual reality content store; determining a criterion based on one or more biometric characteristics, wherein the biometric characteristics are based on a change in one or more physiological states of a user detected while the user is viewing virtual reality content; and in accordance with receiving the request to display the one or more downloadable virtual reality content from the virtual reality content store: displaying, on the display, one or more affordances representing virtual reality content, wherein the one or more affordances representing virtual reality content that meet the criterion are prioritized over the one or more affordances representing virtual reality content that do not meet the criterion.

In some embodiments, an electronic device is described. The electronic device comprising: one or more biometric sensors; a display; means for receiving a request to display one or more downloadable virtual reality content from a virtual reality content store; means for determining a criterion based on one or more biometric characteristics, wherein the biometric characteristics are based on a change in one or more physiological states of a user detected while the user is viewing virtual reality content; and means for in accordance with receiving the request to display the one or more downloadable virtual reality content from the virtual reality content store: displaying, on the display, one or more affordances representing virtual reality content, wherein the one or more affordances representing virtual reality content that meet the criterion are prioritized over the one or more affordances representing virtual reality content that do not meet the criterion.

BRIEF DESCRIPTION OF THE DRAWINGS

In the following description, reference is made to the accompanying drawings which form a part thereof, and which illustrate several examples of the present disclosure. It is understood that other examples may be utilized and structural and operational changes may be made without departing from the scope of the present disclosure. The use of the same reference symbols in different drawings indicates similar or identical items.

FIGS. 1C-1E illustrate examples of the system in the form of mobile devices.

FIGS. 1F-1H illustrate examples of the system in the form of head-mounted display devices.

FIG. 1I illustrates an example of the system in the form of a head-up display device.

DETAILED DESCRIPTION

Figure 1A:
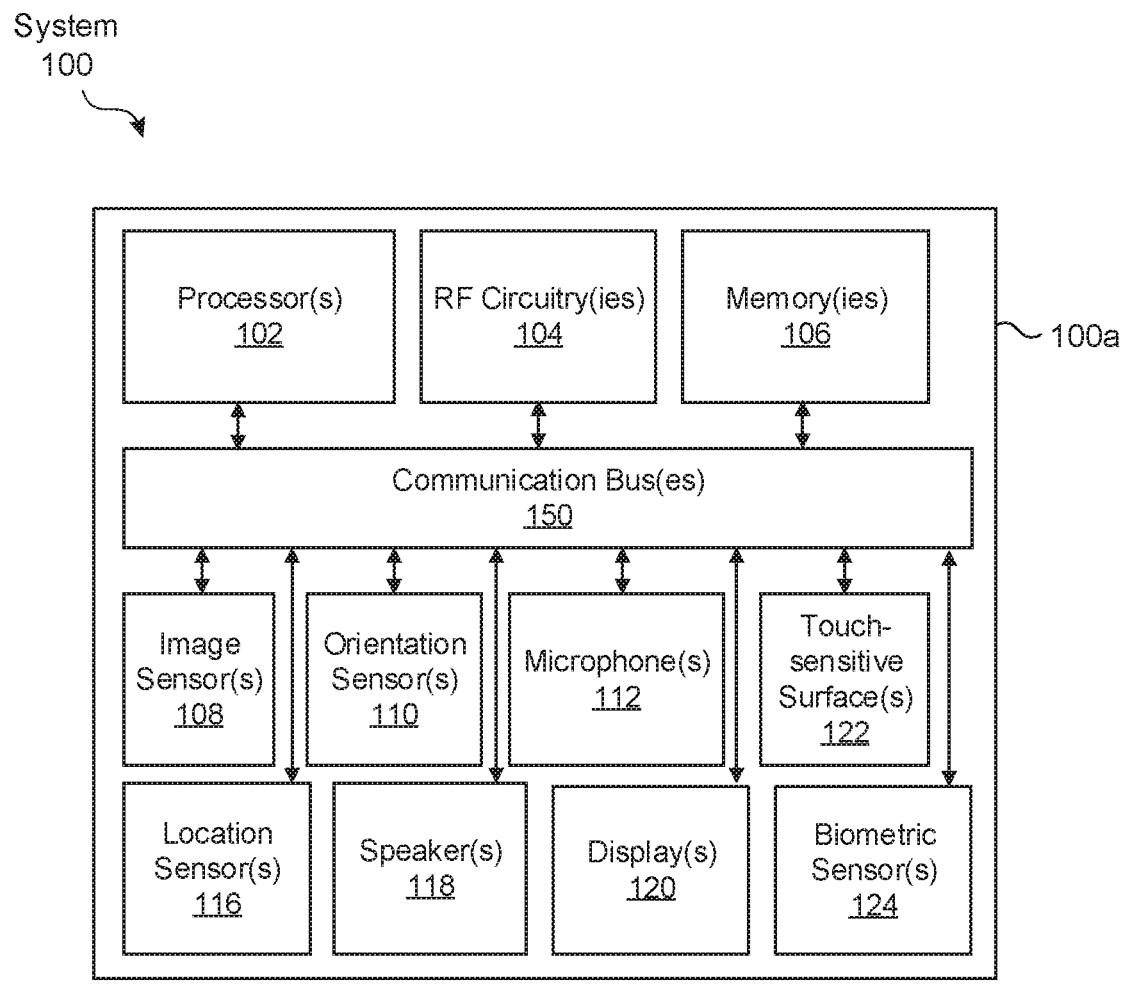
FIGS. 1A-1B depict exemplary systems for use in various computer-generated reality technologies, including virtual reality and mixed reality.

The following description sets forth exemplary methods, parameters, and the like. It should be recognized, however, that such description is not intended as a limitation on the scope of the present disclosure but is instead provided as a description of exemplary embodiments.

The present disclosure provides techniques for the user device to detect and measure one or more biometric characteristics of the user that include one or more physiological states (e.g., vital signs, heart rate) while the user is viewing virtual reality content. The measured biometric characteristics are used to determine a criterion used to recommend virtual reality content to the user that is catered to the user's fitness level. For example, when a user accesses the virtual reality content store, virtual reality content with a rating or score that satisfies the criterion are prioritized over virtual reality content that do not meet the criterion. Optionally, because a first user has different biometric characteristics than a second user, a first user sees different downloadable virtual reality content than a second user sees in the virtual reality content store.

Users can selectively block use of, or access to, personal information such as biometric data. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide specific information, or permit provision of some types of data (e.g., heart rate) but not other types of data. Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
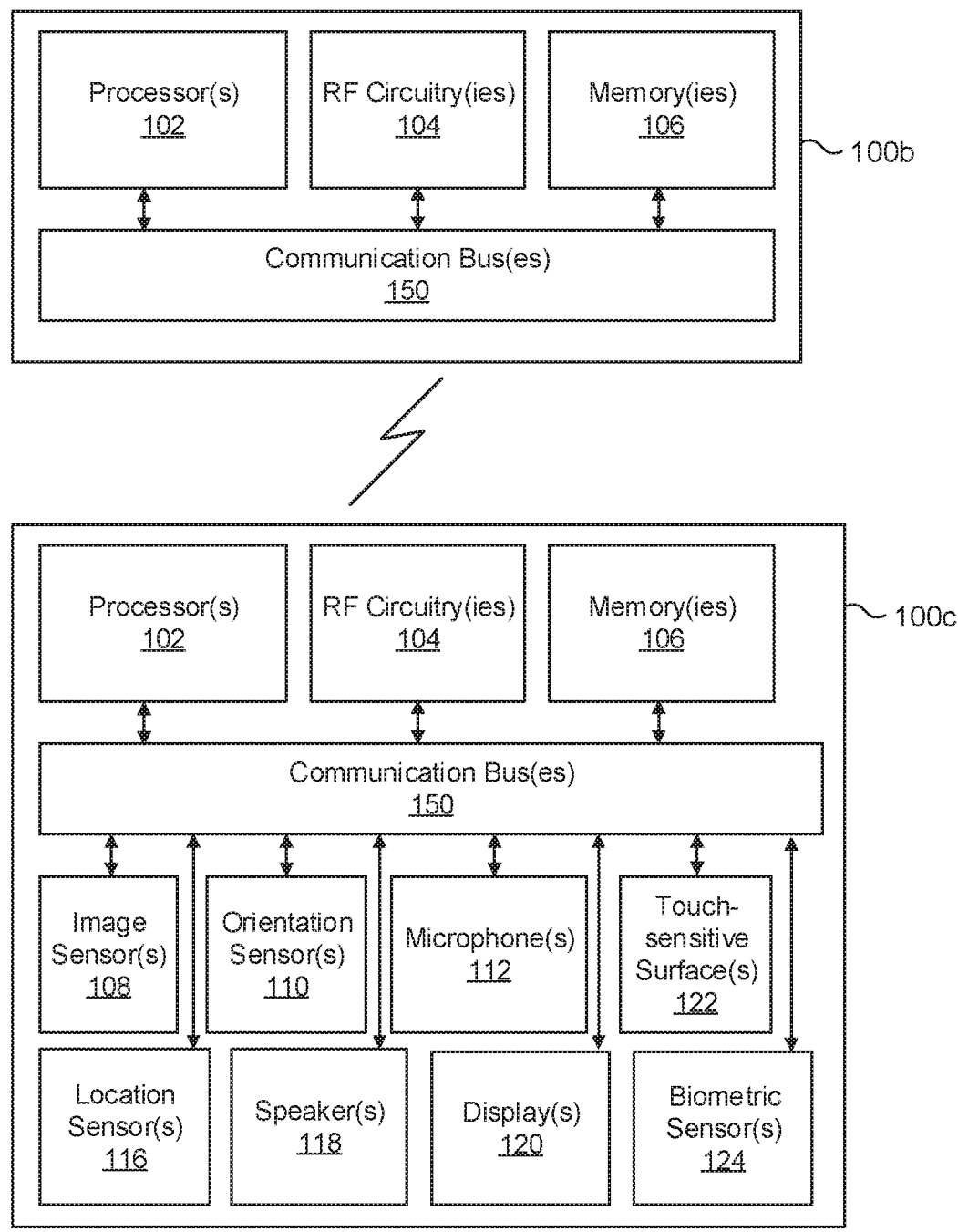

FIG. 1A and FIG. 1B depict exemplary system 100 for use in various computer-generated reality technologies, including virtual reality and mixed reality.

In some embodiments, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, touch-sensitive surface(s) 122, and biometric sensor(s) 124. These components optionally communicate over communication bus(es) 150 of device 100a.

In some embodiments, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some embodiments, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, touch-sensitive surface(s) 122, and biometric sensor(s) 124. These components optionally communicate over communication bus(es) 150 of device 100c.

In some embodiments, system 100 is a mobile device, such as in the embodiments described with respect to device 100a in FIGS. 1C-1E. In some embodiments, system 100 is a HMD device, such as in the embodiments described with respect to device 100a in FIGS. 1F-1H. In some embodiments, system 100 is a wearable HUD device, such as in the embodiments described with respect to device 100a in FIG. 1I.

System 100 includes processor(s) 102 and memory(ies) 106. Processor(s) 102 include one or more general processors, one or more graphics processors, and/or one or more digital signal processors. In some embodiments, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

System 100 includes one or more biometric sensor(s) 124. Biometric sensor(s) 124 include any type of sensor capable of detecting or obtaining physiological information from a user (e.g., vital signs, heart rate, sweat levels, measure of restlessness, blood pressure, breathing rate, body temperature, and physical activity level) while the user is engaged in a virtual reality experience. In some embodiments, biometric sensor(s) 124 may include one or more motion sensors, accelerometers, gyroscopes, cameras, sensors incorporated into a wearable device such as a watch, heart rate sensors, moisture sensors, and thermometers.

In some embodiments, system 100 includes input sensor(s) including touch-sensitive surface(s) 122 for receiving user inputs. In some embodiments, input sensor(s) detect the physical position of the user's hands or fingers using cameras and image sensor(s) 108. In some embodiments, input sensor(s) are used to determine that a user is interacting with a virtual object (such as a CGI representation of an electronic product) being displayed on display(s) 120, enabling system 100 to modify the virtual object based on the user interaction. In some embodiments, the biometric sensor(s) 124 and/or input sensor(s) are separate components. For example, biometric sensors(s) 124 and image sensor(s) are separate components that are in communication with system 100.

In some embodiments, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some embodiments, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

FIGS. 1C-1E illustrate examples of system 100 in the form of device 100a. In FIGS. 1C-1E, device 100a is a mobile device, such as a cellular phone. FIG. 1C illustrates device 100a carrying out a virtual reality technique. Device 100a is displaying, on display 120, a virtual environment 160 that includes virtual objects, such as sun 160a, birds 160b, and beach 160c. Both the displayed virtual environment 160 and virtual objects (e.g., 160a, 160b, 160c) of the virtual environment 160 are computer-generated imagery. Note that the virtual reality environment depicted in FIG. 1C does not include representations of physical objects from the real environment 180, such as physical person 180a and physical tree 180b, even though these elements of real environment 180 are within the field of view of image sensor(s) 108 of device 100a.

FIG. 1D illustrates device 100a carrying out a mixed reality technique, and in particular an augmented reality technique, using pass-through video. Device 100a is displaying, on display 120, a representation 170 of the real environment 180 with virtual objects. The representation 170 of the real environment 180 includes representation 170a of person 180a and representation 170b of tree 180b. For example, the device uses image sensor(s) 108 to capture images of the real environment 180 that are passed through for display on display 120. Device 100a overlays hat 160d, which is a virtual object generated by device 100a, on the head of the representation 170a of person 180a. Device 100a tracks the location and/or orientation of physical objects with respect to the position and/or orientation of device 100a to enable virtual objects to interact with physical objects from the real environment in the augmented reality environment. In this example, device 100a accounts for movements of device 100a and person 180a to display hat 160d as being on the head of the representation 170a of person 180a, even as device 100a and person 180a move relative to one another.

FIG. 1E illustrates device 100a carrying out a mixed reality technique, and in particular an augmented virtuality technique. Device 100a is displaying, on display 120, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a in real environment 180. Device 100a places representation 170a of person 180a in virtual environment 160 for display on display 120. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a. Notably, in this example, device 100a does not display a representation of tree 180b even though tree 180b is also within the field of view of the image sensor(s) of device 100a, in carrying out the mixed reality technique.

FIGS. 1F-1H illustrate examples of system 100 in the form of device 100a. In FIGS. 1F-1H, device 100a is a HMD device configured to be worn on the head of a user, with each eye of the user viewing a respective display 120a and 120b. FIG. 1F illustrates device 100a carrying out a virtual reality technique. Device 100a is displaying, on displays 120a and 120b, a virtual environment 160 that includes virtual objects, such as sun 160a, birds 160b, and beach 160c. The displayed virtual environment 160 and virtual objects (e.g., 160a, 160b, 160c) are computer-generated imagery. In this example, device 100a simultaneously displays corresponding images on display 120a and display 120b. The corresponding images include the same virtual environment 160 and virtual objects (e.g., 160a, 160b, 160c) from different viewpoints, resulting in a parallax effect that provides a user with the illusion of depth of the objects on the displays. Note that the virtual reality environment depicted in FIG. 1F does not include representations of physical objects from the real environment, such as person 180a and tree 180b even though person 180a and tree 180b are within the field of view of the image sensor(s) of device 100a, in carrying out the virtual reality technique.

FIG. 1G illustrates device 100a carrying out an augmented reality technique using pass-through video. Device 100a is displaying, on displays 120a and 120b, a representation 170 of real environment 180 with virtual objects. The representation 170 of real environment 180 includes representation 170a of person 180a and representation 170b of tree 180b. For example, device 100a uses image sensor(s) 108 to capture images of the real environment 180 that are passed through for display on displays 120a and 120b. Device 100a is overlaying a computer-generated hat 160d (a virtual object) on the head of representation 170a of person 180a for display on each of displays 120a and 120b. Device 100a tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of representation 170a of person 180a.

FIG. 1H illustrates device 100a carrying out a mixed reality technique, and in particular an augmented virtuality technique, using pass-through video. Device 100a is displaying, on displays 120a and 120b, a virtual environment 160 with representations of physical objects. The virtual environment 160 includes virtual objects (e.g., sun 160a, birds 160b) and representation 170a of person 180a. For example, device 100a uses image sensor(s) 108 to capture images of person 180a. Device 100a places the representation 170a of the person 180a in the virtual environment for display on displays 120a and 120b. Device 100a optionally tracks the location and/or orientation of physical objects with respect to the position and/or orientation of device 100a to enable virtual objects to interact with physical objects from real environment 180. In this example, device 100a accounts for movements of device 100a and person 180a to display hat 160d as being on the head of the representation 170a of person 180a. Notably, in this example, device 100a does not display a representation of tree 180b even though tree 180b is also within the field of view of the image sensor(s) 108 of device 100a, in carrying out the mixed reality technique.

FIG. 1I illustrates an example of system 100 in the form of device 100a. In FIG. 1I, device 100a is a HUD device (e.g., a glasses device) configured to be worn on the head of a user, with each eye of the user viewing a respective heads-up display 120c and 120d. FIG. 1I illustrates device 100a carrying out an augmented reality technique using heads-up displays 120c and 120d. The heads-up displays 120c and 120d are (at least partially) transparent displays, thus allowing the user to view the real environment 180 in combination with heads-up displays 120c and 120d. Device 100a is displaying, on each of heads-up displays 120c and 120d, a virtual hat 160d (a virtual object). The device 100a tracks the location and/or orientation of physical objects in the real environment with respect to the position and/or orientation of device 100a and with respect to the position of the user's eyes to enable virtual objects to interact with physical objects from real environment 180. In this example, device 100a accounts for movements of device 100a, movements of the user's eyes with respect to device 100a, and movements of person 180a to display hat 160d at locations on displays 120c and 120d such that it appears to the user that the hat 160d is on the head of person 180a.

Figure 2:
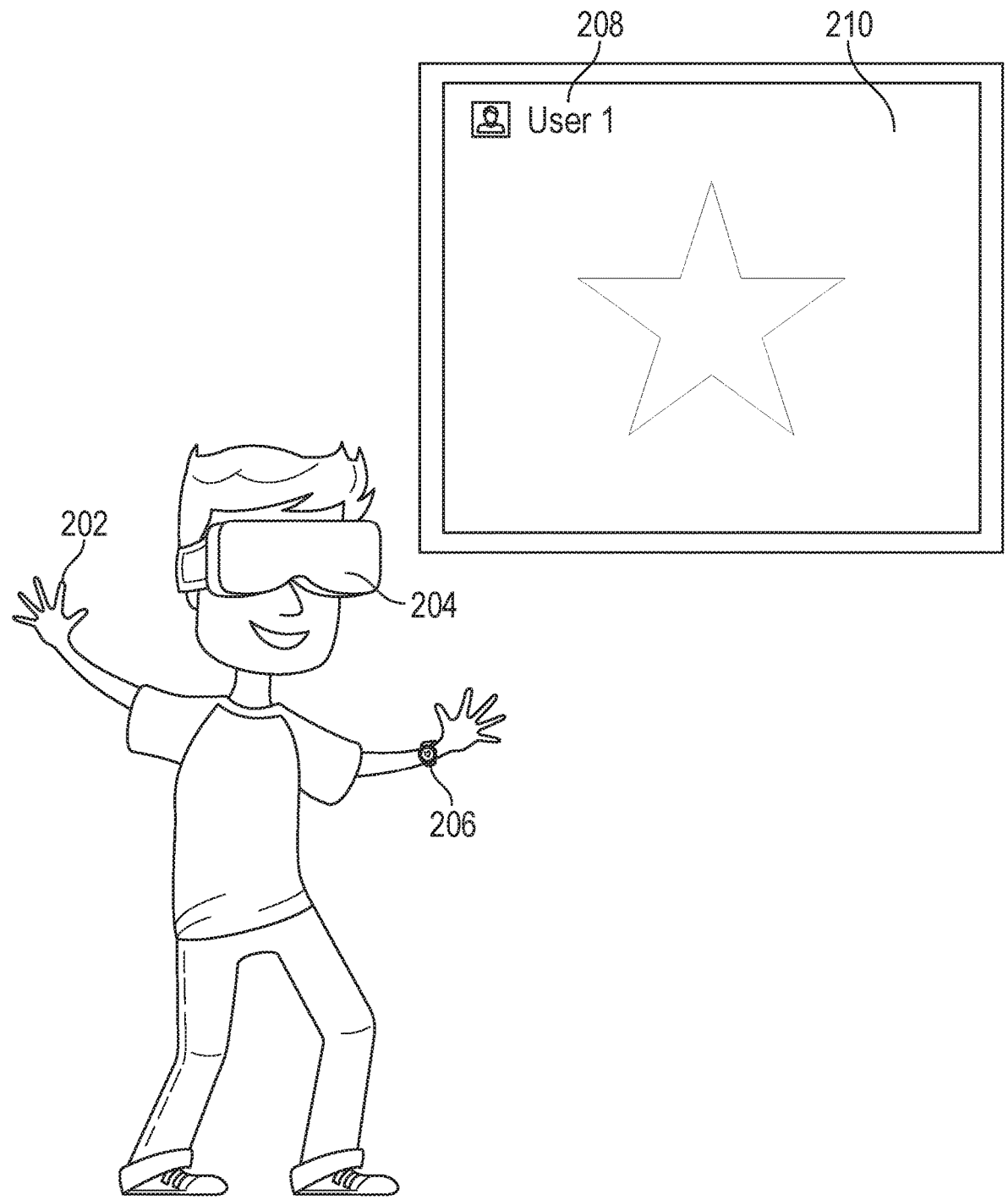
FIG. 2 depicts an example of obtaining biometric characteristics of the user while the user is viewing virtual reality content.

With reference to FIGS. 2-6, exemplary techniques for detecting user biometric characteristics, determining a criterion based on biometric characteristics and using the criterion to suggest relevant virtual reality content to a user in a virtual reality content store are described below. FIG. 2 depicts an example of exemplary devices 204 and 206 detecting user biometric characteristics as user 202 is viewing virtual reality content. In some embodiments, exemplary user device 204 is a standalone device, such as a hand-held mobile device 206, a tablet, or a laptop. In some embodiments, exemplary user device 204 is a HMD. In some embodiments, user device 206 is a wearable device, such as a watch.

In some embodiments, exemplary user device 204 is configured to detect biometric characteristics based on user 202's physiological state while user 202 is viewing virtual reality content 210 through exemplary user device 204. A comfort level of the user is determined based on the detected biometric characteristics. The comfort level is a measure of an activity level or the activeness of the user. The comfort level is based on the physical movement of the user and is a measure of how tired the user is after viewing virtual reality content. For example, the user playing a game in virtual reality that requires rigorous user activity or physical movement has a low comfort level. The user's heart rate my increase, along with the user's breathing rate, sweat level, and/or body temperature. These biometric characteristics are measured by exemplary user device 204 or paired user device 206 (e.g., a watch, motion sensor, sweat monitor, heart rate monitor, and other input devices paired to exemplary user device 204) and used to determine the comfort level of the user.

In some embodiments, the comfort level is determined based on biometric characteristics of the user (e.g., vital signs, heart rate, blood pressure, level of restlessness, facial expressions, gestures, and sweat level) that indicate how comfortable the user feels when viewing virtual reality content. For example, exemplary user device 204 determines whether user 202 feels motion sick based on the measured biometric characteristics. In some embodiments, exemplary user device 204 monitors the user's eye movements, facial expressions, and gestures to determine a comfort level of the user.

In some embodiments, if a paired device 206 (e.g., watch, phone, or other wearable device) is used in addition to exemplary user device 204, exemplary user device 204 receives biometric characteristics detected by the paired device 206, and exemplary user device 204 uses the received biometric characteristics to determine a comfort level. In some embodiments, exemplary user device 204 stores the determined comfort level of the user and/or the biometric characteristics in a user profile. In some embodiments, affordance 208 representing the user profile is displayed in virtual reality scene 210. The affordance of the user profile 208 is associated with user biometric characteristics that are detected while the user is viewing virtual reality content.

Figure 3:
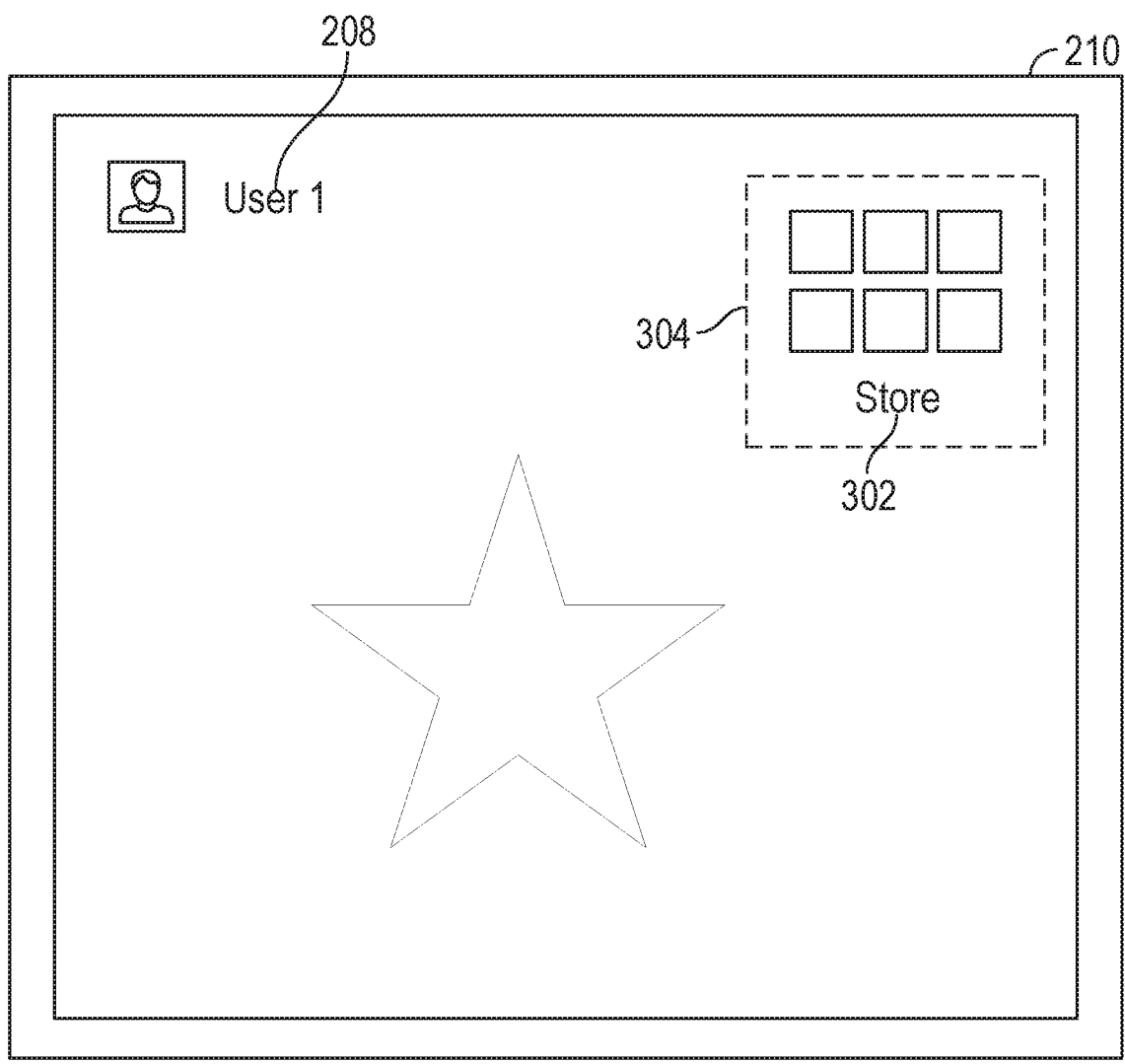
FIG. 3 depicts an exemplary affordance to access the virtual reality content store while the user is viewing virtual reality content.

FIG. 3 depicts an affordance 302 of a virtual application store that is displayed in virtual reality scene 210 when exemplary user device 204 receives a request to display one or more downloadable virtual reality content (e.g., a game, a website, an application) from a virtual reality content store. In some embodiments, exemplary user device 204 receives user input 304 to access the virtual reality store while displaying virtual reality content. In some embodiments, exemplary user device 204 is configured to detect user input through input sensors, motion sensors, or finger tracking sensors. The exemplary user input includes an audio input, a gesture input, or a gaze or eye movement input. The exemplary user input can also include a button press or a touch input on a paired device 206 that is paired with exemplary user device 204. In some embodiments, affordance 302 representing the virtual content store is displayed in the virtual reality scene 210 only when a request to access the virtual reality content store is received. In some embodiments, the affordance 302 representing the virtual content store is always displayed in the virtual reality scene 210. In some embodiments, affordance 302 representing the virtual content store is displayed responsive to a specific user input.

In response to receiving a request to display the virtual reality content store, the exemplary user device determines a criterion based on the comfort level associated with the user's profile is used to determine one or more recommended virtual reality content that is the appropriate level of activity for the user. In some embodiments, the criterion is based on the detected user biometrics, which are based on a change in one or more physiological states of the user detected while the user is viewing virtual reality content. The exemplary user device provides the determined criterion to the virtual reality content store to obtain relevant virtual reality content having an associated score that satisfies the criterion to display in the virtual reality content store.

In some embodiments, the virtual reality contents in the virtual application store have associated scores or ratings that describes the activity and/or comfort level of the contents. For example, a virtual reality content that involves a lot of user physical activity has a high activity level or low comfort level score, while a virtual reality content that is likely to cause motion sickness has a lower comfort level score. The virtual reality content score can be based on a single metric or a plurality of metrics. In some examples, the score of the virtual reality content are based on an initial rating provided by the virtual reality content provider. In some examples, the score of the virtual reality content are based on crowd sourced feedback obtained from a plurality of users who have interacted with the content and have given their consent to share their biometric data.

In some embodiments, crowd sourced biometric characteristics associated with a particular virtual reality content are used to provide feedback for the score of the virtual reality content. As discussed above, user approval should be obtained in advance of collection of biometric data. Crowd sourced information is anonymized in accordance with various examples.

Figure 4:
FIG. 4 depicts an exemplary user device with an exemplary user interface for accessing applications.

FIG. 4 depicts an exemplary user device 408 with a display, a touch-sensitive surface, and exemplary user interface 406 displaying affordances of applications, including affordance 402 representing a virtual reality content store application. In some embodiments, exemplary user device 408 is a standalone device, such as a hand-held mobile device, a tablet, or a laptop. In some embodiment, the exemplary user device 408 is configured to receive a request to access the virtual reality content store directly from the device user interface 406. For example, exemplary user device 408 receives user input 208 at a location corresponding to affordance 402 representing the virtual reality content store. In response to detecting the user input 404, exemplary user device 408 displays the virtual reality content store. For example, user input 404 includes a tap, a gesture, a button press, or a press on affordance 402 representing the virtual reality content store application to access additional virtual reality content.

Figure 5A:
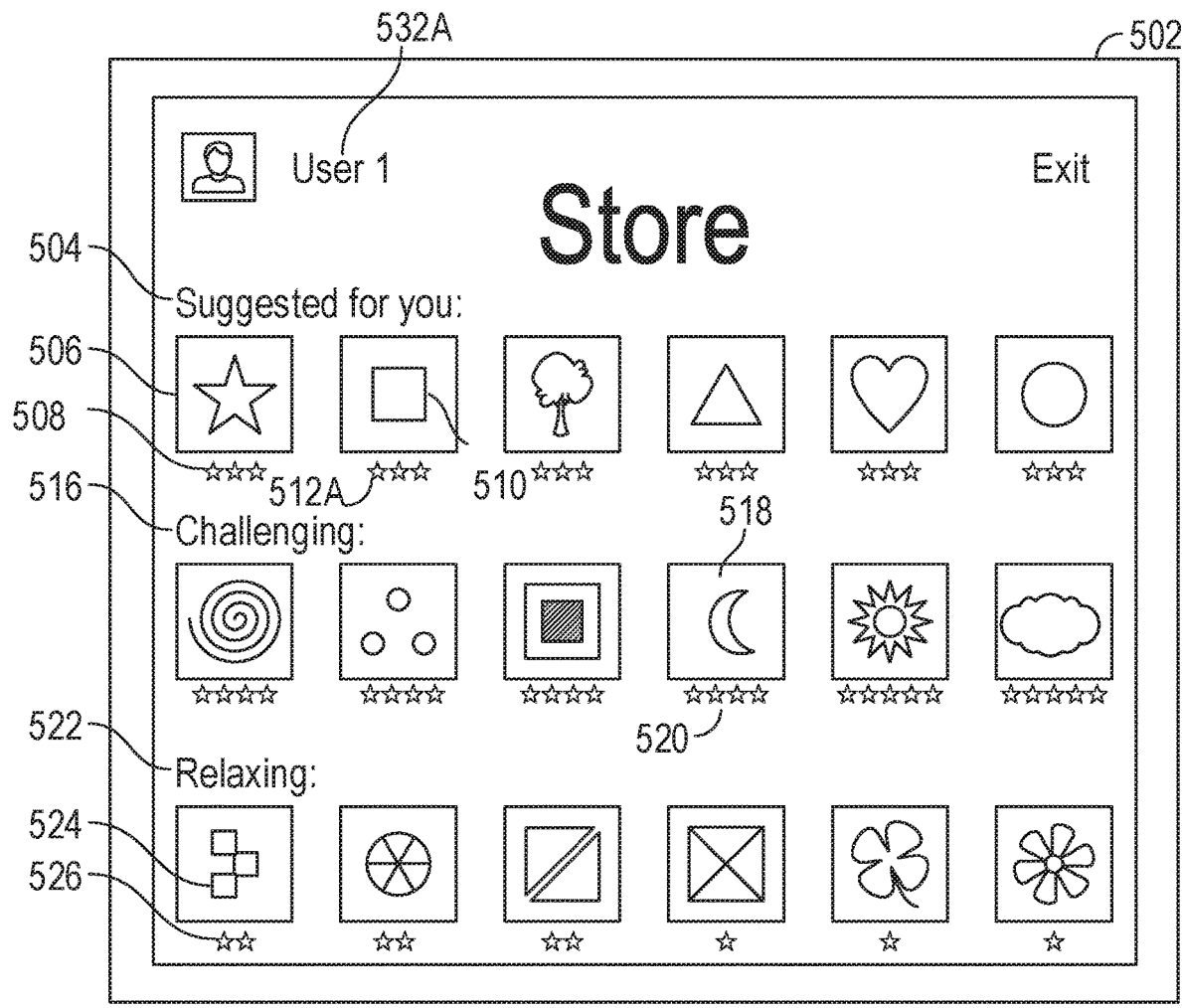
FIG. 5A depicts an example of the virtual reality content store displaying suggested virtual reality content based on the biometric characteristics of a first user.

FIG. 5A depicts an exemplary user interface of virtual reality content store 532 that is displayed by an exemplary user device. In some embodiments, the virtual reality content store includes virtual reality content, such as games, that are accessed or purchased. In some embodiments, the virtual reality content store includes additional downloadable virtual reality content for existing applications (e.g., applications already available on the device). The user device displays, as part of virtual reality content store user interface 502, an affordance of a user profile or user account 532A and one or more affordances of downloadable virtual reality content, for example, affordances 506, 510, 518, and 524. The exemplary user device enables installing or purchasing of downloadable virtual reality content from within a currently running application and directly from virtual reality content store.

In some embodiments, the exemplary user device is configured to display downloadable virtual reality content in the virtual content store user interface 502 according to a criterion based on biometric characteristics or a comfort level associated with user profile 532A. In accordance with receiving a request to display virtual reality content, the exemplary user device displays one or more virtual reality content in the virtual reality content store user interface 502, wherein only virtual reality content with a score meeting the criterion is displayed. In some embodiments, the user device displays downloadable virtual reality content in a virtual reality store user interface 502 where virtual reality content that meet the criterion are prioritized in a first section (e.g., a "Suggested" section) and virtual reality content that do not meet the layout are de-prioritized in one or more different sections, such as "Challenging" section 516 or "Relaxing" section 522.

For example, in FIG. 5A, the criterion is based on a score of three stars. Based on this criterion, the exemplary user interface displays virtual reality content 506 and 510, which each have a respective score (e.g., 508 and 512A) of three stars that meets the criterion. Further, the exemplary user device displays the virtual reality content satisfying the criterion in a prioritized section 504 (e.g., Suggested for you). The exemplary user device displays other downloadable virtual reality contents 518 and 524 that do not meet the criteria in lower priority sections 516 and 522. For example, in FIG. 5A, virtual reality content 518 with a score 520 of five stars does not meet the criterion. Accordingly, the exemplary user device displays virtual reality content 518 in the "Challenging" section 516, which is of lower priority than the "Suggested for you" section 504, which has higher priority. Similarly, for example, the exemplary user device displays virtual reality content 524 with a score 526 of less than three stars in the lower priority "Relaxing" section 522 because the score 526 does not meet the criterion.

In some embodiments, the exemplary user device is configured to provide the user with access to virtual reality content store 502 (e.g., by displaying the virtual reality content store) while displaying virtual content. The exemplary user device determines the criterion used to filter the virtual reality content prior to receiving a user request to access the virtual reality content store. The user device determines the criterion while the displaying virtual reality content and stores the criterion in the user's profile. In some embodiments, the user device determines the criterion based on user biometric characteristics measured after receiving the request to access the virtual reality content store. For example, the user device receives a request to purchase additional virtual reality content while the device is displaying a virtual reality scene in a game. In such an example, the exemplary user device detects the user's heartrate within a predetermined period of time after receiving the request to purchase the additional virtual reality object.

Figure 5B:
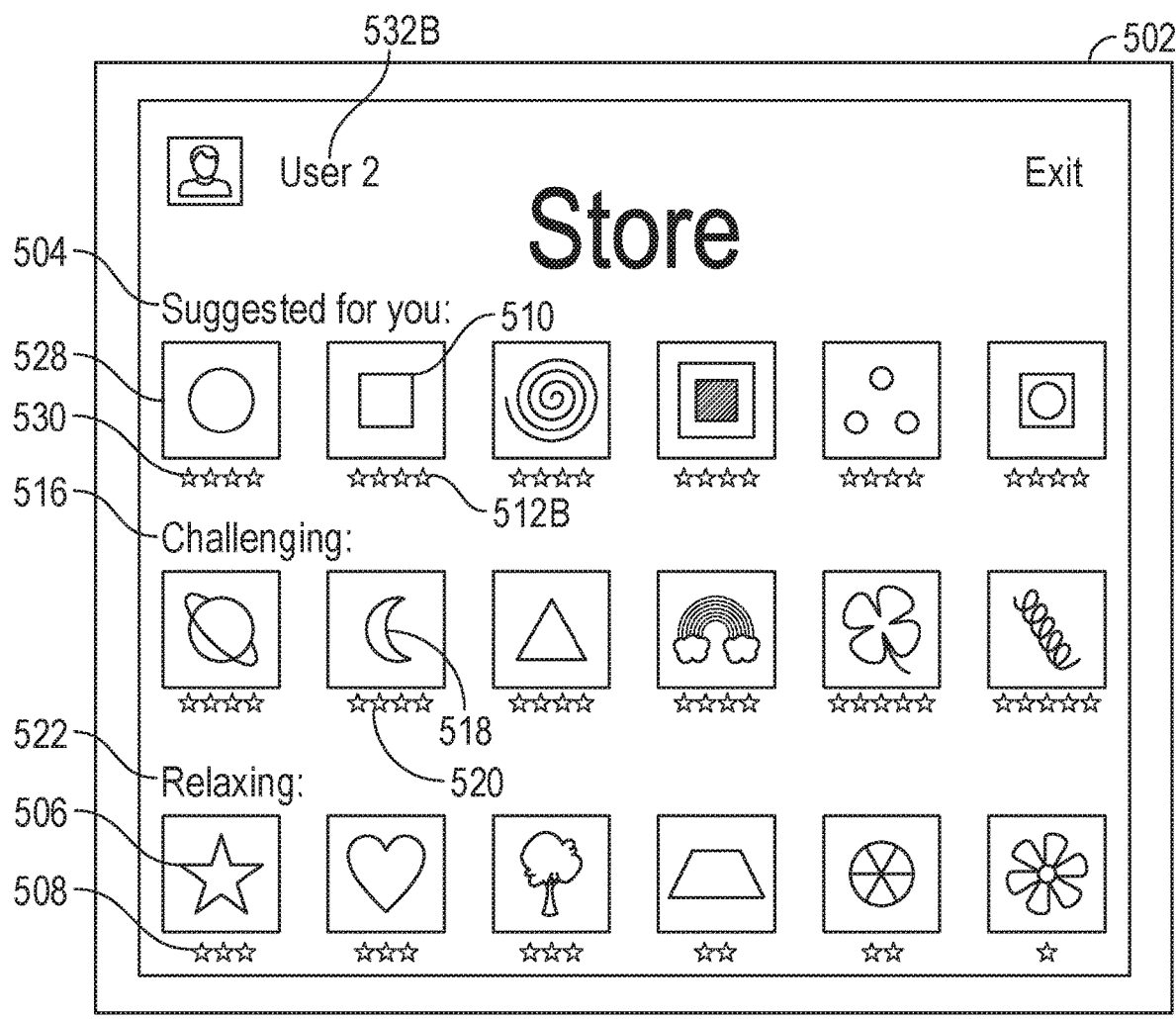
FIG. 5B depicts an example of the virtual reality content store displaying suggested virtual reality content based on the biometric characteristics of a second user.
Figure 6:
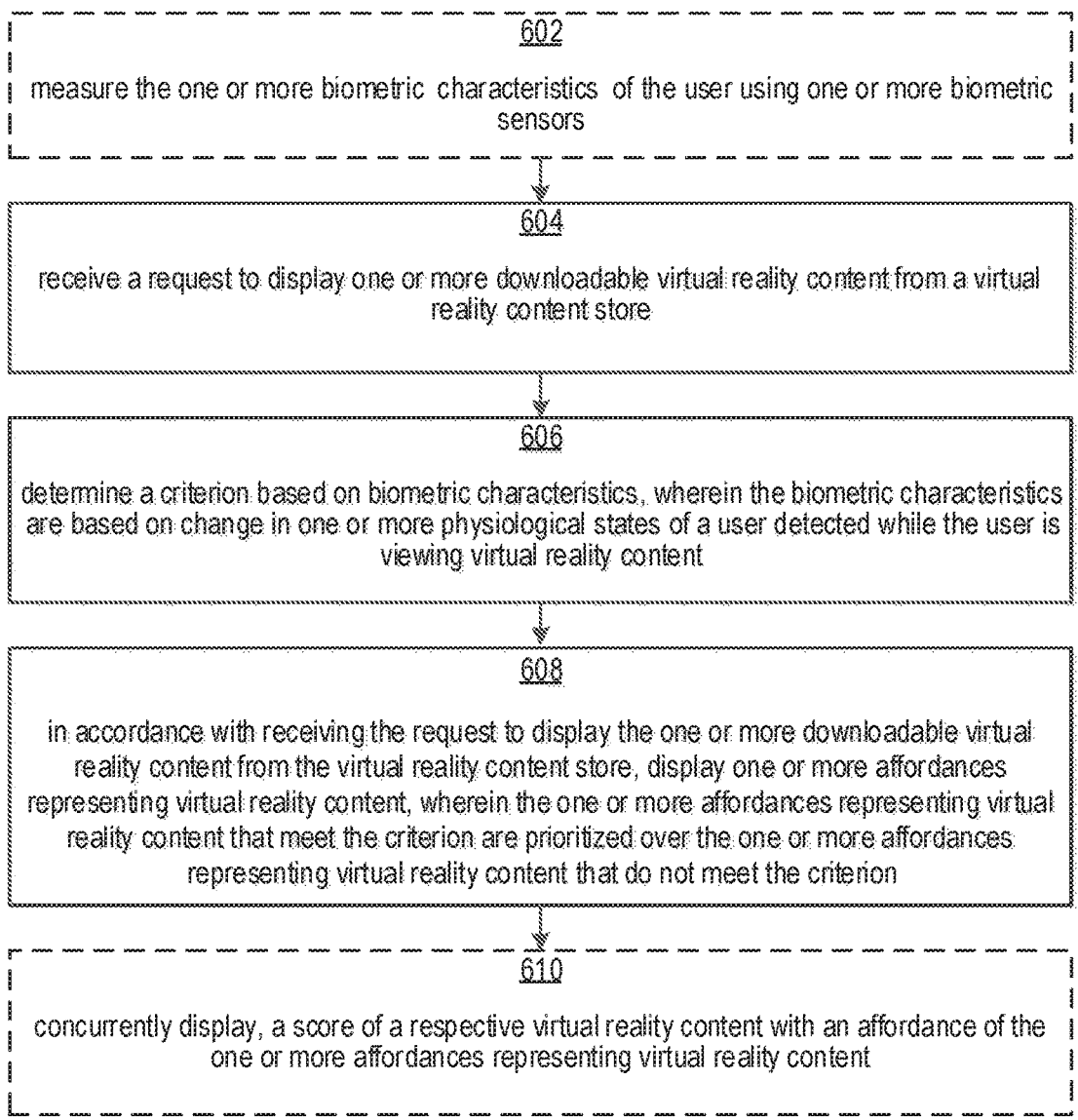
FIG. 6 depicts an exemplary method for using user biometric characteristics in relation to accessing downloadable virtual reality content.

FIG. 5B depicts an exemplary user interface of the virtual reality content store 502 similar to that depicted in FIG. 5A. In FIG. 5B, the exemplary device displays the virtual reality content store user interface including downloadable virtual reality content that is prioritized by a criterion based on the biometric characteristics or a comfort level of a second user 532B. In FIG. 5B, the exemplary device has determined a criterion based on a score of 4 stars, as illustrated by the scores of the virtual reality content in the prioritized section 504. For example, suggested virtual reality content for user 532B includes virtual reality content 528 which has a score 530 that meets the four star score criterion. In another example, the three star score 508 version of virtual reality content 506 meets the criterion of a three star score for user 532A, but does not meet the criterion of a four star score for user 532B. In some examples, a downloadable virtual reality content includes several versions with different ratings. For example, the three star version (score 512A) of virtual reality content 510 is suggested to user 532A, while the four star version (score 512B) of the virtual reality content 510 is suggested to user 532B. FIG. 6 depicts an exemplary method 600 for obtaining biometric characteristics of a user and using the biometric characteristics to determine a criterion used to suggest virtual reality content to a user in a virtual reality content store. In some examples, the method is carried out by an exemplary user device implementing system 100, such as described above.

In the description below, method 600 is described as being performed using an exemplary user device (e.g., device 204, 206). It should be recognized that, in other embodiments, method 600 is performed using one or more electronic devices, such as a paired exemplary user device that is communicatively coupled to an exemplary user device (e.g., mobile phone or laptop). In some embodiments, the operations of method 600 are distributed in any manner between the user device and a paired secondary device, such as a watch. It should be appreciated that the order for performing the blocks of FIG. 6 can be modified. Further, one or more blocks of process 600 can be optional and/or additional blocks can be performed.

At block 602, one or more biometric characteristics of the user are measured by the exemplary user device using one or more biometric sensors or input sensors. For example, the one or more biometric characteristics of the user include one or more physiological states such as the user's vital signs, heart rate, sweat levels, measure of restlessness, blood pressure, breathing rate, body temperature, and physical activity level. The one or more biometric or input sensors on the system include a motion sensor, accelerometer, gyroscope, camera, a sensor incorporated into a wearable device such as a watch, heart rate sensor, and moisture sensor.

The exemplary user device measures biometric characteristics before or after block 604, which describes the system receiving a request to display one or more downloadable virtual reality content from a virtual reality content store. In some embodiments, the exemplary user device measures (upon receiving user permission) biometric characteristics of the user while the user is viewing virtual reality content. For example, the user may be playing a game that requires physical activity. The exemplary user device measures the user's heart rate during the game before a request to access new virtual reality content for the game is received by the device. In some embodiments, the exemplary user device measures biometric characteristics of the user after the user requests to access additional virtual reality content. For example, the exemplary user device receives a request to access new virtual reality content after the user finishes viewing a movie. In some embodiments, the biometric sensors may detect biometric characteristics of the user after viewing virtual reality content to determine whether the user feels motion sick. Accordingly, upon receiving the request for new content, the exemplary user device measures the user's biometric characteristics to determine a criterion for displaying new virtual reality content to a user that is less likely to cause motion sickness.

At block 604, the exemplary user device receives a request to display one or more downloadable virtual reality content form the virtual reality content store. In some embodiments, the exemplary user device receives the request to access the virtual reality content store to access downloadable virtual reality content while the user is viewing a virtual reality experience. For example, while the user is immersed in a virtual reality game, watching video content, or using an application, the exemplary user device receives user input to access the virtual reality content store from within the application. In some embodiments, the exemplary user device receives user input through an audio input, touch input, or a gesture. In some embodiments, the exemplary user device detects a user input comprising touching or tapping an affordance of the virtual reality content store on the user interface of the exemplary user device.

At block 606, the exemplary user interface determines a criterion based on the measured biometric characteristics of the user. For example, the exemplary user device obtains the user's biometric characteristics or comfort level through the user's profile. In some embodiments, the exemplary user device determines the criterion prior to the user making a request to access the virtual reality content store. In some embodiments, exemplary user device determines the criterion after the user has made a request to access the virtual reality content store. In some embodiments, exemplary user device determines the criterion based on the determined comfort level of the user. In some embodiments, the determined comfort level of the user is based on the activity level of the user (e.g., heart rate, breathing rate, body temperature, sweat level, how tired the user is). In some embodiments, the comfort level is how comfortable the user feels after viewing virtual reality content).

The exemplary user device displays only virtual reality content that has a score that matches the criterion determined based on the biometric characteristics of the user. In some embodiments, the one or more downloadable virtual reality content in the virtual reality store have corresponding scores determined based on crowd sourced data collected from a plurality of virtual reality devices that has been collected with user consent. In some embodiments, the score of a downloadable virtual reality content is based on a comfort score determined from biometric characteristics that are collected from a plurality of virtual reality devices used by a plurality of other users who have purchased or interacted with the downloadable virtual reality content. In some embodiments, the score of the downloadable virtual reality content is determined from crowd sourced data that was obtained upon user consent. As discussed above, user approval should be obtained in advance of collection of biometric data, including data to be used to determine a score for the virtual reality content. In some embodiments, the data provided by the virtual reality devices of a plurality of users is made anonymous so that only the physiological data (e.g., the user's vital signs, heart rate, sweat levels, measure of restlessness, blood pressure, breathing rate, body temperature, and physical activity level) is associated with the particular virtual reality content.

At block 608, in accordance with the exemplary user device receiving a request to display one or more downloadable virtual reality content from the virtual reality content store, the exemplary user device displays, on the display, one or more affordances representing virtual reality content where the one or more virtual reality content that meet the criterion are prioritized over the one or more virtual reality content that do not meet the criterion. In some embodiments, the exemplary user device displays virtual reality content that meets the criterion in a suggested section, while virtual reality content that do not meet the criterion are displayed in a de-prioritized section. In some embodiments, virtual reality content that do not meet the criterion are not displayed at all.

At block 610, the exemplary device displays, on the display, the scores of the respective virtual reality content with the affordances representing the virtual reality content in the virtual reality content store user interface. In some embodiments, the exemplary user device displays the scores of the downloadable virtual reality content concurrently with the respective affordances representing the virtual reality content. In other embodiments, the exemplary user device does not display the scores of the downloadable virtual reality content concurrently with the respective affordances representing the virtual reality content. In some embodiments, the exemplary user device displays two different versions of the same content for two different users with different user profiles, where one version of the content has a first rating, and the other version of the has a different rating.

As described above, one aspect of the present technology is the gathering and use of data available from various sources to improve the delivery to users of content.

The present disclosure recognizes that the use of such personal information data, in the present technology, can be used to the benefit of users. For example, the personal information data can be used to deliver targeted content that is of greater interest to the user. In some examples, biometric data is used to deliver targeted content based on the user's comfort level. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country. Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery, the present technology can be configured to allow users to select to "opt in" or "opt out" of participation in the collection of personal information data during registration for services. In another example, users can select not to provide personal biometric data for targeted content delivery services, or to be used as crowd sourced feedback to update the rating of content. In yet another example, users can select to limit the length of time personal biometric data is maintained or entirely prohibit the development of a baseline biometric profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing descriptions of specific embodiments, as described with reference to FIGS. 1A-6, have been presented for purposes of illustration and description. They are not intended to be exhaustive or to limit the scope of the claims to the precise forms disclosed, and it should be understood that many modifications and variations are possible in light of the above descriptions.

What is claimed is:

1. An electronic device, comprising:
one or more biometric sensors;
a display;
one or more processors; and
memory storing one or more programs configured to be executed by the one or more processors, the one or more programs including instructions for:
receiving a request to display downloadable virtual reality content from a virtual reality content store;
prior to displaying the downloadable virtual reality content from the virtual reality content store, determining a criterion based on one or more biometric characteristics, wherein the biometric characteristics are based on a change in one or more physiological states of a user detected while the user is viewing virtual reality content; and
in accordance with receiving the request to display the downloadable virtual reality content from the virtual reality content store:
concurrently displaying, on the display:
one or more affordances representing downloadable virtual reality content that meet the criterion based on one or more biometric characteristics, and
one or more affordances representing downloadable virtual reality content that do not meet the criterion based on one or more biometric characteristics, wherein the one or more affordances representing virtual reality content that meet the criterion based on one or more biometric characteristics are prioritized based on the one or more biometric characteristics over the one or more affordances representing virtual reality content that do not meet the criterion based on one or more biometric characteristics, and wherein the one or more affordances representing virtual reality content that meet the criterion based on one or more biometric characteristics are different from the one or more affordances representing virtual reality content that do not meet the criterion based on one or more biometric characteristics.

2. The electronic device of claim 1, the one or more programs further including instructions for:
prior to determining the criterion, measuring the one or more biometric characteristics of the user using one or more biometric sensors.

3. The electronic device of claim 1, wherein the one or more biometric characteristics includes heart rate.

4. The electronic device of claim 1, wherein the one or more biometric characteristics includes physical activity level.

5. The electronic device of claim 1, wherein the one or more biometric characteristics includes eye movements.

6. The electronic device of claim 1, wherein the one or more characteristics includes facial expressions.

7. The electronic device of claim 1, wherein the downloadable virtual reality content have corresponding scores determined based on data collected from a plurality of VR devices and the downloadable virtual reality content are selected for display at least in part based on the corresponding scores of the downloadable virtual reality content meeting the criterion.

8. The electronic device of claim 1, the one or more programs further including instructions for:
concurrently displaying, on the display, a score of a respective virtual reality content with an affordance of the one or more affordances representing virtual reality content.

9. The electronic device of claim 1, wherein the criterion is determined based on measurements of the one or more characteristics of the user measured prior to receiving the request.

10. The electronic device of claim 1, wherein the criterion is determined based on measurements of the one or more characteristics of the user measured after receiving the request.

11. A non-transitory computer-readable storage medium storing one or more programs configured to be executed by one or more processors of an electronic device with one or more biometric sensors and a display, the one or more programs including instructions for:
receiving a request to display downloadable virtual reality content from a virtual reality content store;
prior to displaying the downloadable virtual reality content from the virtual reality content store, determining a criterion based on one or more biometric characteristics, wherein the biometric characteristics are based on a change in one or more physiological states of a user detected while the user is viewing virtual reality content; and
in accordance with receiving the request to display the downloadable virtual reality content from the virtual reality content store:
concurrently displaying, on the display:
one or more affordances representing downloadable virtual reality content that meet the criterion based on one or more biometric characteristics, and
one or more affordances representing downloadable virtual reality content that do not meet the criterion based on one or more biometric characteristics, wherein the one or more affordances representing virtual reality content that meet the criterion based on one or more biometric characteristics are prioritized based on the one or more biometric characteristics over the one or more affordances representing virtual reality content that do not meet the criterion based on one or more biometric characteristics, and wherein the one or more affordances representing virtual reality content that meet the criterion based on one or more biometric characteristics are different from the one or more affordances representing virtual reality content that do not meet the criterion based on one or more biometric characteristics.

12. The non-transitory computer-readable storage medium of claim 11, further comprising instructions for:
prior to determining the criterion, measuring the one or more biometric characteristics of the user using one or more biometric sensors.

13. The non-transitory computer-readable storage medium of claim 11, wherein the one or more biometric characteristics includes heart rate.

14. The non-transitory computer-readable storage medium of claim 11, wherein the one or more biometric characteristics includes physical activity level.

15. The non-transitory computer-readable storage medium of claim 11, wherein the one or more biometric characteristics includes eye movements.

16. The non-transitory computer-readable storage medium of claim 11, wherein the one or more characteristics includes facial expressions.

17. The non-transitory computer-readable storage medium of claim 11, wherein the downloadable virtual reality content have corresponding scores determined based on data collected from a plurality of VR devices and the downloadable virtual reality content are selected for display at least in part based on the corresponding scores of the downloadable virtual reality content meeting the criterion.

18. The non-transitory computer-readable storage medium of claim 11, further comprising instructions for:
concurrently displaying, on the display, a score of a respective virtual reality content with an affordance of the one or more affordances representing virtual reality content.

19. The non-transitory computer-readable storage medium of claim 11, wherein the criterion is determined based on measurements of the one or more characteristics of the user measured prior to receiving the request.

20. The non-transitory computer-readable storage medium of claim 11, wherein the criterion is determined based on measurements of the one or more characteristics of the user measured after receiving the request.

21. A method of using user biometric characteristics in relation to downloadable virtual reality content, comprising:
at an electronic device with one or more biometric sensors and a display:
receiving a request to display downloadable virtual reality content from a virtual reality content store;
prior to displaying the downloadable virtual reality content from the virtual reality content store, determining a criterion based on one or more biometric characteristics, wherein the biometric characteristics are based on a change in one or more physiological states of a user detected while the user is viewing virtual reality content; and in accordance with receiving the request to display the downloadable virtual reality content from the virtual reality content store:
concurrently displaying, on the display:
one or more affordances representing downloadable virtual reality content that meet the criterion based on one or more biometric characteristics, and
one or more affordances representing downloadable virtual reality content that do not meet the criterion based on one or more biometric characteristics, wherein the one or more affordances representing virtual reality content that meet the criterion based on one or more biometric characteristics are prioritized based on the one or more biometric characteristics over the one or more affordances representing virtual reality content that do not meet the criterion based on one or more biometric characteristics, and wherein the one or more affordances representing virtual reality content that meet the criterion based on one or more biometric characteristics are different from the one or more affordances representing virtual reality content that do not meet the criterion based on one or more biometric characteristics.

22. The method of claim 21, further comprising:
prior to determining the criterion, measuring the one or more biometric characteristics of the user using one or more biometric sensors.

23. The method of claim 21, wherein the one or more biometric characteristics includes heart rate.

24. The method of claim 21, wherein the one or more biometric characteristics includes physical activity level.

25. The method of claim 21, wherein the one or more biometric characteristics includes eye movements.

* * * * *